June 4, 1957  R. W. WATERFILL  2,794,598
FLOW CONTROL APPARATUS
Filed July 1, 1953  2 Sheets-Sheet 1

INVENTOR.
Robert W. Waterfill
BY
Pollard and Johnston
ATTORNEYS

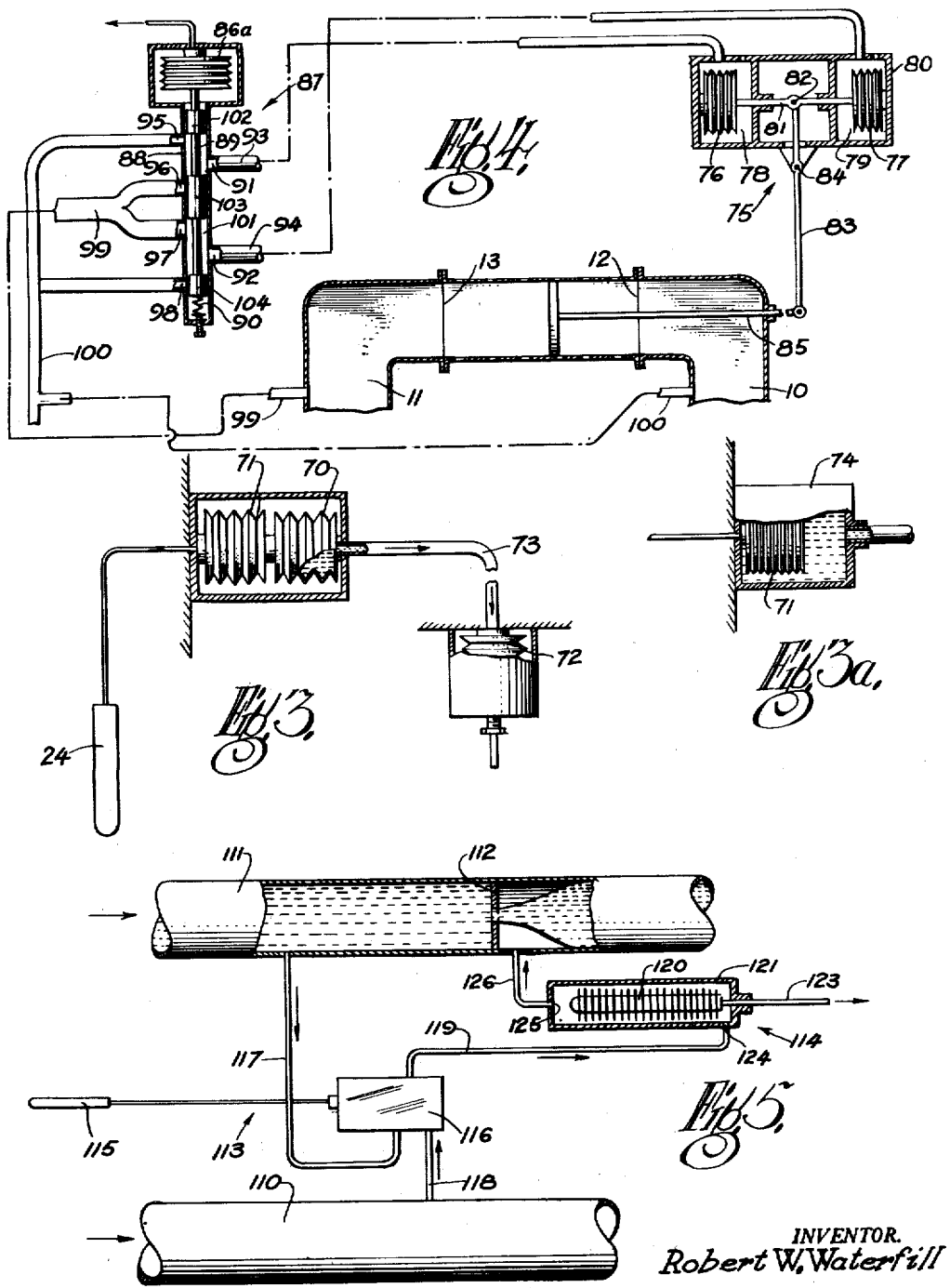

United States Patent Office 2,794,598
Patented June 4, 1957

2,794,598

FLOW CONTROL APPARATUS

Robert W. Waterfill, Montclair, N. J., assignor to Buensod-Stacey, Incorporated, New York, N. Y., a corporation of Delaware Application July 1, 1953, Serial No. 365,379

11 Claims. (Cl. 236—13)

This invention relates to new and improved control devices which possess general utility but are adapted particularly for use in air conditioning systems.

In many fluid distribution systems, particularly air conditioning systems having individual temperature regulation in each zone or room conditioned, automatic control devices are conventional equipment. Under present practices, such control devices generally employ separate power circuits for providing the necessary energy to actuate the mechanical control elements in the fluid distribution system. For example, auxiliary electric or pneumatic circuits are commonly used in cooperation with condition responsive members to operate relays for actuation of dampers, valves, activating and inactivating members. While these flow or proportioning control devices perform satisfactorily, they are expensive to install and maintain, for usually the auxiliary power has to be distributed from a central power unit to all control members in the fluid distribution system.

Proportioning control devices that do not depend on or use an external source of power are well-known and usually comprise a condition responsive member connected with a resilient diaphragm or bellows by a suitable closed system containing a fluid responsive to condition changes. The sensitivity of these devices is narrowly limited, for they do not have the capacity to develop sufficient power in response to small condition changes for operating the regulating members of the fluid distribution system. While it is possible to increase the size of the condition responsive element to increase their effective sensitivity, they become increasingly expensive and impractical to install because of their excessive size. Moreover, there is no known fluid of moderate pressure which would be capable of acting as a charge or fill for such a system; i. e. which would develop sufficient power within normal operating ranges.

It is therefore an object of the present invention to provide new and improved control devices for fluid distribution systems which eliminate the above-mentioned shortcomings of known devices. More particularly, the present invention provides a self-contained control device for regulating fluid flow in a system such as a fluid distribution system, which develops in response to small condition changes ample power for actuating regulating members in the system without complicated or excessively large construction and also without requiring an auxiliary power source.

Another object of this invention is to provide a control device which is quite practical and economical to construct, install and maintain; which is accurate over a comparatively wide range of operating conditions; which is protected against excessive operating conditions; and which is also compact and may be assembled as a unit in many fluid distribution systems.

According to preferred embodiments of this invention, a self-contained control device is employed at each control station for regulating the setting of flow or proportioning control mechanical elements in a fluid distribution system, such as dampers. The control device is provided with a condition responsive member which is extremely sensitive but which, of itself, is incapable of developing sufficient power in response to small condition changes to reset the mechanical control elements of the system. This member acts as a master control or pilot for a main power or amplifying member which utilizes energy available in the fluid of the system controlled for developing power. The condition responsive pilot control varies the condition of the fluid acting on the main power member so that it will develop power in direct proportion to power developed by the condition responsive member and of sufficient magnitude to operate such mechanical control elements.

In the illustrated embodiments, the invention is shown applied to a fluid distribution system delivering warm and cold fluid separately to each place of use. Such embodiments include a temperature sensitive pilot member and a power member that effects operation of dampers in the warm and cold fluid supply ducts of the system. The power member is energized by warm and cold fluid taken from the system controlled and delivered to the power element in proportions determined by the temperature sensitive member so that the power developed by such power element will be directly proportional to that developed by the pilot member and will serve to control the temperature of the zone involved. Thus, the control device may be conveniently assembled as a unit for individual installation at each control station, for it is self-contained and does not require the use of an external source of power.

Other objects, features and advantages of the invention will become apparent from the following detailed description and the accompanying drawings showing illustrative embodiments of the invention.

In the drawings:

Figure 3 is a detail view of a pressure relay system that may be employed with the self-contained thermal control;

Figure 3a is another form of construction of the pressure relay of Figure 3;

Figure 4 is a fragmentary view partly in section of another embodiment of the self-contained thermal control according to this invention; and Figure 5 is a fragmentary view of a closed fluid distribution system employing the self-contained thermal control system of Figure 1.

Although the invention is illustrated in Figures 1 to 4 as a thermal control applied to air distribution units for air conditioning systems of the type in which warm air and cold air are separately delivered to zones being conditioned and temperature is to be controlled, it is to be understood that the invention has other forms and general utility, and that it may be employed with many other arrangements, such as the closed fluid system shown in Figure 5.

Figure 1:
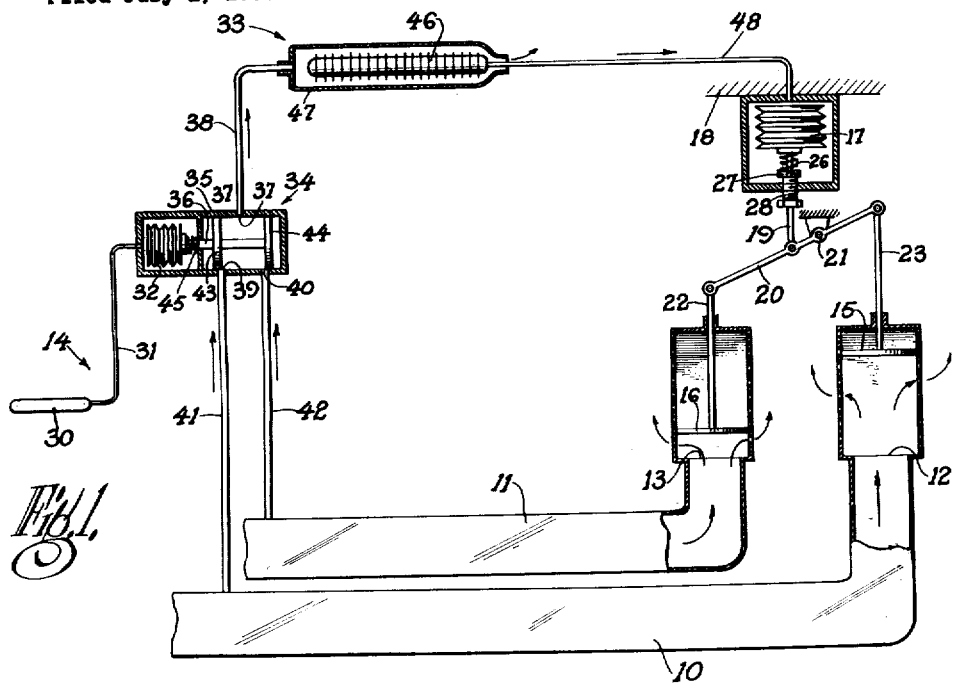
Figure 1 is a diagram of a fluid distribution system using a self-contained thermal control according to the present invention, showing various parts in vertical cross section.

Referring now particularly to Figure 1, the zone air distributing unit includes a warm air supply duct 10 and a cold air supply duct 11 which register with air inlet ports 12 and 13, respectively. Zone temperature is regulated by a thermostat 14 disposed in the zone, which controls the position of warm air damper 15 and of cold air damper 16 so as to admit the proper proportions of warm air and cold air that are needed to satisfy the thermostat.

Damper motor 17 may be of any suitable type, such as the fluid pressure controlled bellows type illustrated, or it can be an electrically operated motor. The damper motor is mounted on a suitable fixed support 18 and has a connecting rod link 19 fixed at one end to the free end of the bellows and pivoted at its other end to a lever arm 20, which is pivoted about a fixed axis 21. Pivoted to one end of lever arm 20 is a plunger 22 which operates cold air damper 16; pivoted to the other end of lever arm 20 is a plunger 23 that operates warm air damper 15. By this construction, downward linear movement of connecting rod link 19 will swing the lever arm 20 counterclockwise about its pivot axis 21 so as to open warm air damper 15 and to close cold air damper 16, and upward movement of the link 19 will swing lever arm 20 clockwise about pivot 21 so as to close the warm air damper and to open the cold air damper and thus control temperature of the zone.

A coil spring 26 normally biases the bellows motor towards a collapsed or unexpanded position, but is yieldable when the pressure within the bellows is sufficient to overcome its compression to permit expansion of the bellows and change in the positions of the dampers. The initial setting of the bellows may be selectively varied by adjustment of the compression of spring 26; for example, a collar 27 forming an abutment for one end of spring 26 may be moved by an adjustable set screw 28, which is threaded into a tapped hole in the motor casing.

In combination with the elements just described, Figure 1 shows a fluid proportioning control device, the nature of which is suitably adapted for air conditioning systems of the aforementioned type. The control device comprises a condition responsive unit which controls operation of the damper motor through a power unit utilizing fluid from the system controlled to develop power. In the form shown, the condition responsive unit is thermostat 14, hereinafter referred to as the pilot thermostat, which may be selectively set in any well-known manner and which includes a temperature sensitive element or bulb 30 disposed in the room or zone being conditioned and connected by a capillary tube 31 to a pressure-controlled bellows 32. The power unit is preferably another thermostat 33, hereinafter referred to as the power thermostat, which is operated by air tapped from the air supply ducts. An air valve 34 regulates the flow of warm and cold air to the power thermostat so as to control the temperature of the fluid acting on such thermostat. Valve 34 has a relatively fixed housing 35 and a relatively movable valve plunger 36 actuated by bellows 32. The valve is provided with a central port 37 for connection through an air supply line 38 with power thermostat 33; it is also provided with laterally offset ports 39 and 40 on opposite sides of port 37 for connection, respectively, with air conduits 41 and 42 that tap air from the warm and cold air supply ducts 10 and 11. The plunger 36 carries a pair of axially spaced discs or pistons 43 and 44, and is normally biased by a compression spring 45 acting on bellows 32 to a position in which disc 43 opens port 39 to port 37 and disc 44 closes port 40. Expansion of the bellows will cause the gradual closing of the warm air port 39 and gradual opening of the cold air port 40.

Power thermostat or motor 33 includes a temperature sensitive element bulb 46, which may have fins, enclosed in a surrounding housing 47 which is open adjacent opposite longitudinal ends of the bulb. Air supply line 38 registers with one of these openings and delivers air into the housing and over the bulb, and the other end of the housing is open to provide a relief to the atmosphere for air that has passed over the bulb. The latter is connected to the damper bellows motor 17 by a capillary 48.

It is to be understood that as room temperature increases, the air valve bellows 32 will expand and will move plunger 36 in a direction to close warm air port 39 and open cold air port 40 in air valve 34. In this way the temperature of the air acting on the power thermostat is reduced, and spring 26 acts to move the damper motor connecting rod 19 upwardly a degree corresponding to the pressure drop in damper bellows 17. Damper plungers 22 and 23 are thereby moved to admit more cold air and to reduce the amount of warm air admitted so as to satisfy the thermostat setting. By this construction a slight temperature variation in the room being conditioned, which by itself would not produce a sufficient power to move the dampers, will be sufficient to reset valve plunger 36 and to effect a much larger temperature change in the air passing over the power thermostat bulb 46. The power thermostat will then produce sufficient power to actuate the dampers for varying the proportionate amounts of warm and cold air delivered into the zone. For example, a 1° variation in temperature in the zone will result in a 15° to 20° change in the temperature of the air delivered to the power thermostat; such a temperature change in many known fluids will develop adequate power for actuating the dampers. The power thermostat is preferably a vapor pressure tube system with a limited charge or fill so that the charge will be completely gasified at a certain temperature such as at 80° F.; extreme temperatures will then produce very little pressure changes in the bellows, thereby preventing excessive expansion so that the bellows will remain accurate at its normal operating range of temperature.

Figure 2:
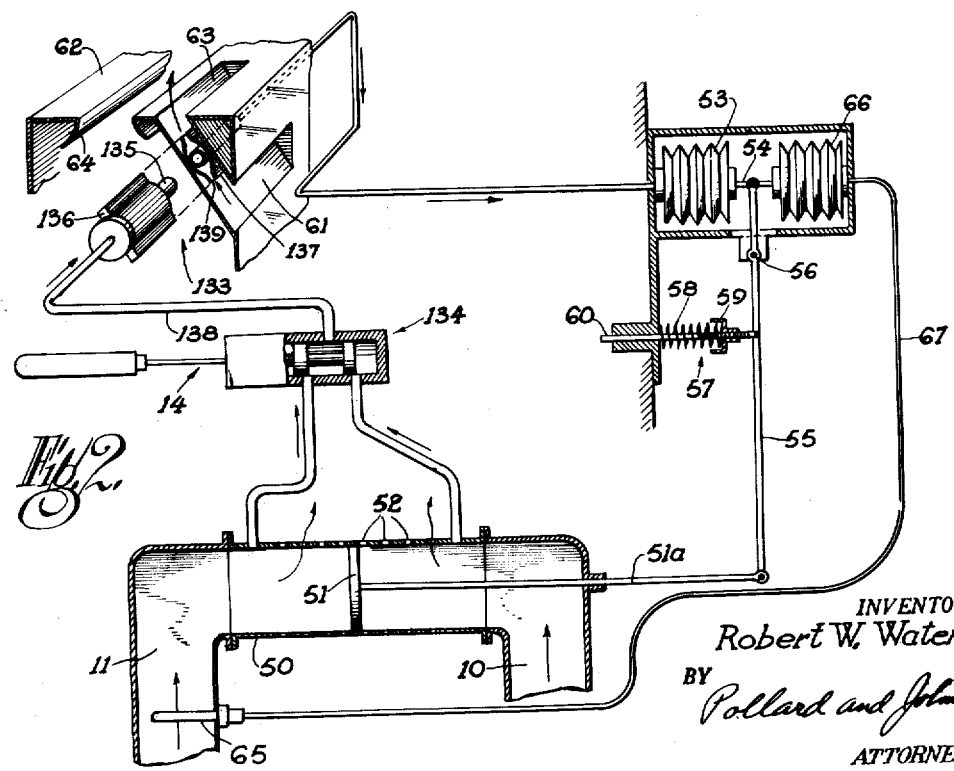
Figure 2 is a diagram, partly in vertical cross section and partly in perspective, of a modified fluid distribution system using the self-contained thermal control of Figure 1. In this arrangement the thermal control is provided with an ambient temperature compensating device.

In the embodiment shown in Figure 2, a damper motor control device according to the invention is applied to a fluid distribution system employing a different damper arrangement than that shown in Figure 1. In this embodiment a straight-line air flow or proportioning control member 50 extends between and communicates at opposite ends with the warm air supply duct 10 and the cold air supply duct 11. A single damper 51 extending transversely across member 50 at a right angle to the axis of the member is movable axially between opposite ends of member 50, and cooperates with side wall apertures 52 to proportion the amounts of warm and cold air admitted from the air supply ducts into the zone or room being conditioned. Damper motor, bellows 53, operates the damper 51 through suitable linkage including a motor connecting rod link 54 and a lever arm 55, which is pivoted between its end on a fixed axis 56. On the side of the axis 56 opposite to the connecting rod link, lever arm 55 is pivotally connected with the damper plunger 51a so that expansion or contraction of the bellows 53 will swing lever arm 55 about its pivot axis and will move the damper linearly between the ends of member 50. The bellows motor 53 is normally biased towards its collapsed or unexpanded position by a resilient member 57 acting on lever 55, the resilient member yielding under pressure in the bellows sufficient to overcome the biasing force so as to permit expansion of the bellows. The resilient member 57 includes a compression spring 58 surrounding a partially threaded shaft 60 which is pivoted at one end to lever 55 and is slidably mounted in a fixed guideway at its other end. The spring is held between the wall surrounding the guideway and an adjustable collar 59 threaded to shaft 60. Thus, initial setting of the power motor 53 may be selectively set by suitable adjustment of spring compression.

The motor control device operating the damper motor 53 may be the same as that shown in Figure 1, or it may be a somewhat modified device as illustrated. The pilot thermostat 14, which is disposed in the room or zone being conditioned, operates the power thermostat 133 by a three-way valve 134. Power thermostat 133 has a bulb 135 disposed in a suitable slot 61 and within a surrounding casing 136 having an inlet opening 137 connected with the outlet port of valve 134 by conduit 138. The slot 61 is formed in the zone air distributing box or unit 62 and opens at 63 adjacent the conditioned air discharging nozzle or opening 64, so as to define an air passage through which the air in the room may be induced to flow by the aspirating effect of the conditioned air discharge through opening 64. The casing 136 has longitudinal extending openings 139 at opposite sides thereof and aligned with the path of air flow through said passage so that air passing through said slot will pass over said bulb. By this apparatus the pilot thermostat regulates the temperature of the air passing over the bulb 135 by passing warm or cold air to casing 136 in response to temperature changes sensed by the pilot thermostat.

Usually the temperature of the cold air supplied is relatively low and the control system always has a cold fluid available. In the event that the cold air supplied approaches the ambient temperature of the room, a temperature compensating device may be provided to reset the damper motor 53. Such device is shown as a thermostat unit including a temperature sensitive bulb 65 disposed in the cold air supply duct and a bellows 66 connected thereto by a capillary tube 67. One end of bellows 66 is fixed to the damper motor housing and the other end is free and is connected to damper motor connecting rod 54. It will be understood that bellows 66 may reset damper motor bellows 53 so that the power required to operate the damper motor increases or decreases as the temperature of the cold air supply varies. For example, when cold air supply temperature increases and approaches the temperature of zone air, bellows 66 will expand and will tend to reset bellows 53 and damper 51 to admit more cold air into the zone and to reduce the amount of power required to contract bellows 53. Conversely, when cold air supply temperature decreases, bellows 66 will contract and will tend to move damper 51 toward a position closing the cold air inlet port. Hence, it will require more power to increase cold air supply.

The time lag associated with long capillary tubes may be avoided by use of a relay power transmission. One such transmission may take the form of a closed fluid pressure system such as shown in Figure 3, which includes a bellows 70 to act as a pump, damper motor bellows 72 and a connecting conduit 73. The pump bellows 70 is connected to and actuated by the power thermostat bellows 71; the pump bellows 70, when acted upon by thermostat bellows 71, develops pressure in the closed fluid system and effects movement of the damper bellows 72, thereby actuating the dampers. Alternatively, the power thermostat bellows 71 may act as the pump for the fluid pressure system. This arrangement is shown in Figure 3a wherein bellows 71 is submerged in the fluid pressure chamber 71.

The embodiment shown in Figure 4 differs from the arrangement shown in Figures 1 and 2 in that the power element of the control device is the damper motor itself. In this arrangement the damper motor 75 includes a pair of opposing bellows members 76 and 77 within chambers 78 and 79, respectively, formed within motor housing 80. The confronting movable ends of the bellows members are connected with opposite ends of a common connecting rod 81, which has a pivotal connection at 82 with one end of a lever arm 83. The latter rocks about a fixed pivot axis 84 and has its other end pivoted to damper plunger 85 for operating the damper in the manner described above.

In this embodiment the fluid control device comprises a pilot thermostat (not shown) operating an air valve 87 which admits and proportions power fluid tapped from the supply ducts to the pressure operated element of the damper motor. Air valve 87 includes a relatively fixed element or body 88 and a relatively movable plunger 89. The latter has one end which abuts, or is attached to, the movable end wall of pilot thermostat bellows 86a and is normally biased by a compression spring 90 to a position in which the dampers open the warm air inlet port 12 and closes the cold air inlet port 13. The plunger is movable backwards from that position to effect a gradual opening of such cold air inlet port and closing of such warm air inlet port.

Various known air valves are suitable for this purpose. The one shown has formed in valve body 88: axially spaced ports 91 and 92 for connection, respectively, through air conduits 93 and 94 to chambers 78 and 79, and four laterally offset ports 95, 96, 97 and 98 for connection with the air supply lines. The two central offset ports 96 and 97 are connected by suitable branches with the cold air supply line 99, which taps cold air from the main cold air supply duct 11; the two end offset ports 95 and 98 are connected by suitable branches with the warm air supply line 100, which taps warm air from the main warm air supply duct 10. The valve body is formed with an elongated chamber 101 into which the plunger 89 extends. The plunger carries spaced pistons 102, 103 and 104. Piston 102 controls flow into conduit 93 from warm air supply conduit 100; piston 103 controls flow into conduits 93 and 94 from cold air supply conduit 99; and piston 104 controls flow into conduit 94 from warm air supply line 100.

When pressure in the pilot thermostat bellows is not sufficient to overcome the compression of spring 90, the plunger will be biased to the position shown in Figure 4 in which warm air entering port 95 passes through port 91 and conduit 93 to chamber 78 and cold air entering port 97 passes through port 92 and conduit 94 to chamber 79. Air inlet ports 96 and 98 are sealed off by pistons 103 and 104, respectively. In this position warm air in chamber 78 dilates bellows 76 and cold air in chamber 79 contracts bellows 77, thereby swinging lever arm 83 clockwise about its fixed pivot and moving damper 105 to a position closing cold air inlet port 13 and fully opening warm air inlet port 12.

As temperature rises in the room or zone, bellows 86a of pilot thermostat 86 expands and moves the valve plunger 89 backwards so that piston 102 gradually closes port 95 to conduit 93 and piston 103 opens port 96 to conduit 93. At the same time piston 103 closes port 97 to port 94 and piston 104 opens port 98 to port 92. As the valve plunger is moved backwards, it will be seen that the temperature of air passing to chamber 78 decreases while that passing to chamber 79 increases, thereby effecting counterclockwise movement of lever arm 83 and an opening of cold air inlet port 13 and a closing of warm air inlet port 12. Thus, the proportions of warm and cold air admitted into the zone or room will be automatically varied to satisfy the pilot thermostat by a self-contained, highly sensitive air control, device which does not require any external power.

Figure 5 shows a fluid control device according to the invention applied to a closed fluid distribution system wherein the fluid, for example, water, cannot be released to the atmosphere. In this arrangement the pressure of the fluid in cold fluid supply pipe 110 is preferably higher than the pressure of the fluid in the warm fluid supply pipe 111. An orifice plate 112 lies transversely across warm fluid supply pipe 111 to produce a high pressure area on the upstream side of the plate and a low pressure area on the downstream side of the plate. Warm fluid tapped from supply duct 111 on the upstream side of the plate 112 and cold water tapped from supply duct 110 are respectively passed in proportions determined by a pilot thermostat, indicated at 113, similar in construction and operation to that shown in Figure 1 to a power thermostat 114. The pilot thermostat includes a temperature sensitive bulb 115 and a three-way valve 116, the latter having connection with the warm and cold fluid supply ducts through lines 117 and 118, and with the pilot thermostat through line 119.

The power thermostat 114 includes the elongated finned temperature sensitive bulb 120 enclosed within an elongated housing 121. A capillary tube 123 connects the bulb with a suitable pressure-operated actuating element (not shown), which actuates the flow control member in supply ducts 110 and 111. The housing 121 has an inlet port 124 proximate one end of the bulb 120 for connection with the fluid supply line 119. The housing is also formed with an outlet port 125 near the other end of bulb 120 for connection through conduit 126 with supply pipe 111 at the low pressure, downstream side of orifice plate 112. It is to be understood that the temperature of the fluid flowing to the power thermostat 114 is regulated by the pilot thermostat 113, and that such fluid flows from points of high pressure in the supply conduits through valve 116, line 119, then along the length of bulb 120 in power thermostat housing 121 and through line 126 to a low pressure area in supply pipe 111. In this way the pilot thermostat responds to small temperature changes in a room or zone and effects appreciable power development in a second thermostatic element without requiring any power other than that available in the system regulated.

It should be apparent that various details of construction can be changed without departing from the spirit of the invention as defined in the appended claims.

What is claimed is:

1. In a temperature control arrangement for an air conditioning system including warm and cold air supply conduits delivering air at different conditions to a zone and valve means controlling flow of such warm and cold air through said supply conduits to said zone, the combination including a control device comprising a closed fluid actuated power unit energized by air from each of said air supply conduits, said power unit having a movable member controlling positions of said valve means, a control element having air connection means with each of said supply conduit to lead air from each to said control element and having air connection means with said power unit to deliver air thereto, said control element having a movable member to proportion and mix the air passed from each of said supply conduits to said power unit, and external zone temperature responsive means controlling the position of said movable control element member to actuate it for varying the flow of air from each of said conduits to effect changes in the condition of the air passed to said power unit proportional to but of greater magnitude than the condition changes sensed by such external condition responsive means.

2. In a system including warm and cold air supply conduits and valve means controlling flow of such air through said supply conduits, the combination including a control device comprising a fluid actuated power unit energized by air withdrawn from each of the supply conduits, said power unit including a fluid pressure motor having a plunger connected with the valve means and biased by the pressure in the motor in one direction, adjustable resilient means biasing the plunger in opposition to the fluid pressure in said motor, a pilot valve having inlet openings for connection with the warm and cold air supply conduits and an outlet opening connected with the power unit for passing air to said unit, a movable valve plunger to proportion and mix the warm air and cold air passed to the power unit, and ambient temperature responsive thermostat control means positioning the plunger of the pilot valve to vary the energization of said power unit in response to ambient temperature changes.

3. In a system including warm and cold fluid supply conduits and valve means controlling flow of such fluids through said supply conduits, the combination including a control device comprising a power unit energized by fluid withdrawn from the supply conduits, said power unit including a fluid pressure motor having a plunger connected with the valve means and biased by the pressure in the motor in one direction, adjustable resilient means biasing the plunger in opposition to the fluid pressure in said motor, a pilot valve having inlet openings for connection with the warm and cold fluid supply conduits and an outlet opening connected with the power unit for passing fluid to said unit, a movable valve plunger to proportion and mix the warm fluid and cold fluid passed to the power unit, ambient temperature responsive thermostat control means positioning the plunger of the pilot valve to vary the energization of said power unit in response to ambient temperature changes, and means operative in response to increased temperatures in the cold fluid supply conduit to impart a compensating force to said fluid pressure-operated motor plunger in opposition to the fluid pressure of said motor so as to reduce the power required to operate such plunger.

4. In a temperature control system including warm and cold air supply conduits and valve means controlling flow of such air through said supply conduits to a zone to be conditioned, a control device comprising a main thermostat having a temperature sensitive element energized by air withdrawn from the supply conduits, a fluid pressure-operated motor connected therewith, a casing surrounding said temperature sensitive element and having an inlet opening and an outlet opening at opposite ends thereof, said fluid pressure-operated motor having a plunger connected with the valve means and biased by the pressure in the motor in one direction, adjustable resilient means biasing the plunger in opposition to the fluid pressure in the motor, a pilot valve having inlet openings for connection with each of said warm and cold supply conduits and an outlet opening connected with the inlet opening of said casing for passing proportioned air from said supply conduits to said casing and over the temperature sensitive element, the plunger of said pilot valve proportioning the warm fluid and cold air passed to the temperature sensitive element, and ambient temperature responsive thermostat control means positioning the plunger of the pilot valve to vary the energization of said thermostat in response to ambient temperature changes, so as to control the temperature of the zone.

5. In a temperature control unit, air flow control means for an air conditioning system or the like, the combination comprising warm air and cold air supply ducts, damper means in the warm air and cold air supply ducts controlling discharge of air from said supply ducts into the zone being conditioned, a control device comprising a main thermostat having a temperature sensitive element disposed in a path of induced zone air flow, a fluid pressure-operated motor connected therewith, a casing surrounding said temperature sensitive element and having an inlet opening at one end thereof, said casing also having opposing lateral openings aligned with said induced air flow so that such air will enter said casing and pass over the temperature sensitive element, said fluid pressure-operated motor having a plunger connected with the valve means and biased by the pressure in the motor in one direction, adjustable resilient means biasing the plunger in opposition to the fluid pressure in the motor, a pilot valve having inlet openings for connection with the warm and cold air supply conduits and an outlet opening connected with the inlet opening of said casing for passing fluid to said casing and over the temperature sensitive element, the plunger of said pilot valve regulating the amount of flow of each fluid to said temperature sensitive element so as to vary the temperature of the air passing thereover, and ambient temperature responsive thermostat control means positioning the plunger of the pilot valve to vary the energization of said main thermostat in response to ambient temperature changes.

6. In an air flow control means for an air conditioning system or the like, the combination comprising warm air and cold air supply ducts, damper means in the warm air and cold air supply ducts, controlling discharge of air from said supply ducts into the zone being conditioned, a control device comprising a main thermostat having a temperature sensitive element disposed in a path of induced zone air flow, a fluid pressure-operated motor connected therewith, a casing surrounding said temperature sensitive element and having an inlet opening at one end thereof, said casing also having opposing lateral openings aligned with said induced air flow so that such air will enter said casing and pass over the temperature sensitive element, said fluid pressure-operated motor having a plunger connected with the valve means and biased by the pressure in the motor in one direction, adjustable resilient means biasing the plunger in opposition to the fluid pressure in the motor, a pilot valve having inlet openings for connection with the warm and cold air supply conduits and an outlet opening connected with the inlet opening of said casing for passing fluid to said casing and over the temperature sensitive element, the plunger of said pilot valve regulating the amount of flow of each fluid to said temperature sensitive element so as to vary the temperature of the air passing thereover, ambient temperature responsive thermostat control means positioning the plunger of the pilot valve to vary the energization of said thermostat in response to ambient temperature changes, and means operative in response to increased temperatures in the cold air supply conduit to impart a compensating force to said fluid pressure-operated motor plunger in opposition to the fluid pressure of said motor so as to reduce the power required to operate such plunger.

7. In a fluid distribution system including warm and cold fluid supply conduits and valve means controlling flow of such fluids through said supply conduits, the combination including a control device comprising a main thermostat having a temperature sensitive element and an expansible member, a fluid pressure-operated motor, a closed fluid system filled with liquid and extending between said thermostat and said fluid pressure-operated motor, said closed fluid system having a confined liquid body at the thermostat end thereof to which pressure impulses received by said expansible member are imparted for transmission to said fluid pressure-operated motor at the other end of said system, an enclosure for said temperature sensitive element having inlet and outlet openings, said fluid pressure-operated motor having a plunger connected with the valve means and biased by the pressure in the motor in one direction, adjustable resilient means biasing the plunger in opposition to the fluid pressure in the motor, a pilot valve having inlet openings for connection with the warm and cold fluid supply conduits and an outlet opening connected with the inlet opening of said enclosure for passing fluid to said enclosure and over the temperature sensitive element, the plunger of said pilot valve proportioning the warm fluid and cold fluid passed to the thermostat, and ambient temperature responsive thermostat control means positioning the plunger of the pilot valve to vary the energization of said main thermostat in response to ambient temperature changes.

8. In a system including warm and cold fluid supply conduits and valve means controlling flow of such fluids through said supply conduits, the combination including a control device comprising a main thermostat having a temperature sensitive element and an expansible element, a fluid pressure-operated motor, a closed fluid system filled with liquid and extending between said thermostat and said fluid pressure-operated motor, a pump member at one end of said closed fluid system controlling pressure within said fluid pressure-operated motor at the other end of said system, said pump member being connected with and actuated by the expansible member of said thermostat, an enclosure for said temperature sensitive element having inlet and outlet openings, said fluid pressure-operated motor having a plunger connected with the valve means and biased by the pressure in the motor in one direction, adjustable resilient means biasing the plunger in opposition to the fluid pressure in the motor, a pilot valve having inlet openings for connection with each of said warm and cold fluid supply conduits and an outlet opening connected with the inlet opening of said enclosure for passing fluid to said enclosure and over the temperature sensitive element, the plunger of said pilot valve proportioning the warm fluid and cold fluid passed to the thermostat, and ambient temperature responsive thermostat control means positioning the plunger of the pilot valve to vary the energization of said main thermostat in response to ambient temperature changes.

9. In a system including warm and cold fluid supply conduits and valve means controlling flow of such fluids through said supply conduits, the combination including a control device comprising a power unit energized by fluid withdrawn from each of supply conduits, said power unit including axially aligned, oppositely acting temperature responsive fluid pressure-operated motors having a common plunger movable therebetween, said plunger being connected with the valve means and biased by pressure in one motor in one direction and by pressure in the other motor in the opposite direction, a pilot valve having inlet openings for connection with the warm and cold fluid supply conduits and outlet openings for connection with the power unit to deliver fluid thereto, a movable valve plunger to proportion and mix the warm fluid and cold fluid passed to the power unit, and ambient temperature responsive thermostat control means positioning the plunger of the pilot valve to vary the energization of the power unit in response to ambient temperature changes.

10. In a system including warm and cold fluid supply conduits and valve means controlling flow of such fluids through said supply conduits, the combination including a control device comprising a power unit energized by a fluid withdrawn from each of said supply conduits, said power unit including oppositely acting expansible members charged with fluid of moderate pressure at normal operating temperatures and having a common plunger therebetween, said plunger being connected with the valve means and biased by pressure in one expansible member in one direction and by pressure in the other expansible member in the opposite direction, an enclosure for each expansible member having an inlet opening and an outlet opening, a pilot valve having inlet openings for connection with the warm and cold fluid supply conduits and outlet openings for connection with the inlet openings of the enclosures for said expansible members, a movable valve plunger to proportion and mix the relative amounts of warm fluid and cold fluid passed to each of said enclosures, an ambient temperature responsive thermostat control means positioning the pilot valve to vary the energization of the power unit in response to ambient temperature changes.

11. In an air conditioning system having air sources therein at two different temperatures, a self-contained control system including means feeding said air to a zone from each of said sources, a power unit, modulating control means for feeding air from each of said sources to said power unit for operating the same to proportion the air fed to a zone from each of said sources, and ambient temperature sensitive means connected to said modulating control means for proportioning the air fed from each of said sources to said power unit in accordance with the ambient temperature so as to control the temperature of said zone.

References Cited in the file of this patent

UNITED STATES PATENTS

| | | |
|---|---|---|
| 1,869,663 | Cartier | Aug. 2, 1932 |
| 2,221,347 | Giesler | Nov. 12, 1940 |
| 2,479,307 | Camilli | Aug. 16, 1949 |
| 2,487,367 | Peple | Nov. 8, 1949 |

FOREIGN PATENTS

| | | |
|---|---|---|
| 70,835 | Austria | Jan. 10, 1916 |

UNITED STATES PATENT OFFICE

CERTIFICATE OF CORRECTION

Patent No. 2,794,598                          June 4, 1957

Robert W. Waterfill

It is hereby certified that error appears in the printed specification of the above numbered patent requiring correction and that the said Letters Patent should read as corrected below.

Column 10, line 13, after "of" insert -- said --.

Signed and sealed this 13th day of August 1957.

(SEAL)
Attest:
KARL H. AXLINE                                           ROBERT C. WATSON
Attesting Officer                                  Commissioner of Patents